J. S. KINGSLAND.
Car Wheel.
No. 52,859.
Patented Feb. 27, 1866.
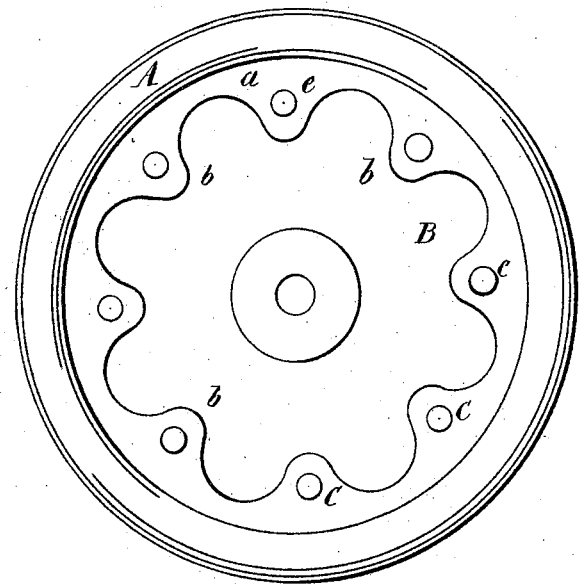
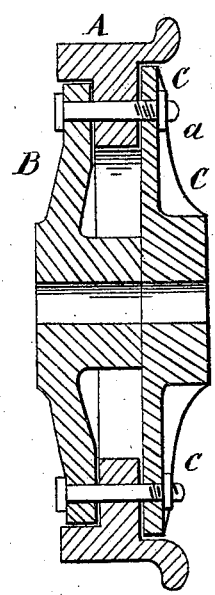
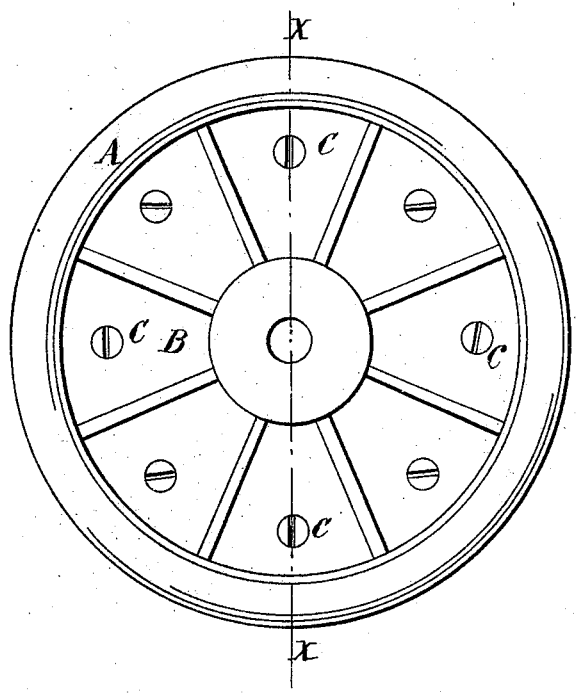
Witnesses:
Inventor:

UNITED STATES PATENT OFFICE.

JAMES S. KINGSLAND, OF STRYKER, OHIO.

IMPROVEMENT IN CAR-WHEELS.

Specification forming part of Letters Patent No. 52,859, dated February 27, 1866.

*To all whom it may concern:*

Be it known that I, JAMES S. KINGSLAND, of Stryker, Williams county, State of Ohio, have invented a new and useful Improvement in Car-Wheels; and I do hereby declare that the following is a full, clear, and exact description thereof, which will enable others skilled in the art to make and use the same, reference being had to the accompanying drawings, forming part of this specification, in which—

Figure 1 is an interior side view of my invention, one of the side plates of the wheel being removed; Fig. 2, a section of the same, taken in the line $x\ x$, Fig. 3; Fig. 3, an exterior side view of the same.

Similar letters of reference indicate like parts.

This invention relates to a new and useful improvement in cast-iron car-wheels; and it consists in casting the wheel in three separate pieces, consisting of the rim and two side plates, and securing the same together by means of bolts, substantially as herein described, whereby the rim of the wheel, when worn by use, may be readily replaced by a new one, and being cast separately may be chilled very hard and evenly throughout, so as to resist wear much better than the rims of ordinary wheels, which are cast entire or in one piece.

The invention also obviates the difficulty of cracking or checking in cooling, which attends the casting of wheels in one piece.

A represents the tread or rim of the wheel, which is cast separately and with a flange, $a$, projecting from its inner surface at right angles. This flange $a$ is of scallop form, as shown in Fig. 1, the projections $b$, formed by the scallops, being for bolts $c$ to pass through.

B C are the two side plates of the wheel, the outer parts of which abut against the sides of the flange $a$, and are secured thereto by the bolts $c$.

By this arrangement it will be seen that the tread or rim of the wheel may be cast with a chill without any danger of cracking in cooling and chilled evenly throughout. In fact, the three parts may be cast without any difficulty whatever, and when the tread or rim becomes worn by use it may be readily replaced by a new one.

The ordinary car-wheels, which are cast entire or in one piece, are worthless when the tread or rim is worn out, and a new wheel must be placed on the axle, which is attended with considerable labor in boring, fitting, &c., whereas by my invention the tread or rim may be replaced without this inconvenience, for the side plates, B C, will last indefinitely.

I claim as new and desire to secure by Letters Patent—

A car-wheel cast in three separate parts, secured together as described, and consisting of the side pieces, B C, whose central enlargements form the hub for the spindle, and whose outer margins embrace and are bolted to the inwardly-projecting flange of the rim A.

JAMES S. KINGSLAND.

Witnesses:
JOSEPH L. KINGSLAND,
GAVIN CAMPBELL.